UNITED STATES PATENT OFFICE.

WILHELM MATT, OF ATHENIA, NEW JERSEY.

FIRE AND WATER PROOF COMPOUND.

SPECIFICATION forming part of Letters Patent No. 412,035, dated October 1, 1889.

Application filed May 4, 1888. Renewed August 27, 1889. Serial No. 322,085. (No specimens.)

*To all whom it may concern:*

Be it known that I, WILHELM MATT, a resident of Athenia, in the county of Passaic and State of New Jersey, have invented a new and useful Fire and Water Proof Compound or Mortar for Building and Decorative Purposes; and I do hereby declare that the following is a full and exact description thereof.

My invention relates to the manufacture of a plastic compound adapted to serve as a substitute for lime mortar in covering and finishing walls.

The object of said invention is to produce at a low cost a water-proof compound having all the desirable qualities of ordinary mortar, but which shall be much harder and more durable, and which when applied to woodwork in a thin coat will adhere thereto, render the same both fire and water proof, and impart to it a surface of stony hardness.

It consists in the admixture of the following-named ingredients, substantially in the manner and proportions set forth, as follows: Take of ordinary commercial glue about ten pounds and dissolve the same in one hundred and twenty pounds of pure water. Stir into this solution about thirty-five to forty pounds either of paper or wood pulp, or, preferably, as a substitute for either, a mixture of about twenty pounds of paper-pulp and fifteen pounds of wood pulp. Make a paste by dissolving about three and one-half pounds of starch or cereal flour in two pounds of water and boiling the same. Stir this paste into the solution of glue and pulp, and then add to the compound of glue, pulp, and paste about five pounds of commercial whiting, which being stirred in will bring the compound to the consistency of batter. Finally, by means of any well-known form of mixing-machine, thoroughly incorporate into this batter of glue, pulp, paste, and whiting about one hundred and twenty pounds of plaster-of-paris and about fifteen pounds of the fine ashes of bituminous or anthracite coal, and work the mass mechanically until it is reduced to a completely homogeneous and plastic condition, when it will be ready for use. It may be kept in this condition by exclusion of air.

I contemplate the use of bullocks' or other animal blood admixed with water, in about the proportion of one hundred pounds of blood to thirty pounds of water, as an equivalent for the solution of glue in water.

In use this plastic compound is applied in the same manner and under the same conditions, substantially, as ordinary lime mortar, and will set and harden in about the same time, and with the advantage of being not only fire-proof, but also water-proof.

The proportions as above given of the respective ingredients are those which have been found by practical experiments to be best adapted for the end in view; but they will admit of being varied with good results, and I do not wish to be confined strictly thereto; but I contemplate in my invention the use of the ingredients named in such proportions as will accomplish substantially the results set forth.

I claim as my invention—

The within-described plastic compound, consisting of a solution of water, glue, pulp, and paste, in about the proportions named, thickened by the admixture therewith of whiting, plaster-of-paris, and coal-ashes, substantially in the proportions set forth.

In testimony whereof I have signed my name to this specification in the presence of two subscribing witnesses.

WILHELM MATT.

Witnesses:
A. N. JESBERA,
E. M. WATSON.